United States Patent Office
3,806,512
Patented Apr. 23, 1974

3,806,512
2-AMINO-3-PYRIDYLCARBONYLTHIOPHENE COMPOUNDS
Michio Nakanishi, Oita, and Masami Shiroki, Tetsuya Tahara, and Kazuhiko Araki, Fukuoka, Japan, assignors to Yoshitomi Pharmaceutical Industries, Ltd., Osaka, Japan
No Drawing. Continuation-in-part of abandoned applications Ser. No. 177,807, Sept. 3, 1971, and Ser. No. 222,290, Jan. 31, 1972. This application July 27, 1972, Ser. No. 275,584
Claims priority, application Japan, Sept. 3, 1970, 45/77,997, 45/77,998; Feb. 5, 1971, 46/4,878; July 15, 1971, 46/52,983; Aug. 28, 1971, 46/65,964
Int. Cl. C07d 31/50
U.S. Cl. 260—294.8 D
13 Claims

ABSTRACT OF THE DISCLOSURE 2-amino-3-pyridylcarbonylthiophene compounds of the general formula:

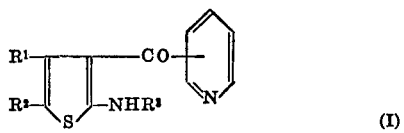

wherein each of $R^1$, $R^2$ and $R^3$ is H or $C_{1-4}$ alkyl such as methyl, ethyl, propyl, butyl or isobutyl, or $R^1$ and $R^2$ combinedly form —$(CH_2)_4$—;
5-pyridyl-thieno[2,3-e][1,4]diazepin-2-one compounds of the formula:

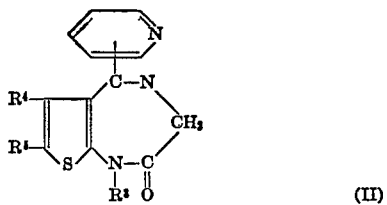

wherein each of $R^3$, $R^4$ and $R^5$ is a member selected from the group consisting of H and a lower alkyl group of from 1 to 4 carbon atoms; and the pharmaceutically acceptable acid addition salts thereof. The compounds of the Formula I are useful as analgesic-anti-inflammatory agents, and the compounds of the Formula II are useful as anticonvulsants.

CROSS-REFERENCE TO RELATED APPLICATIONS

This application is a continuation-in-part application of copending applications, Ser. No. 177,807, filed Sept. 3, 1971 and Ser. No. 222,290, filed Jan. 31, 1972, both now abandoned.

SUMMARY OF THE INVENTION

This invention relates to novel and therapeutically valuable 2-amino-3-pyridylcarbonylthiophene compounds of the general formula:

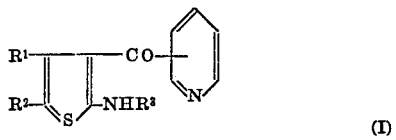

and pharmaceutically acceptable acid addition salts thereof, wherein each of $R^1$, $R^2$ and $R^3$ is H or $C_{1-4}$ alkyl such as methyl, ethyl, propyl, butyl or isobutyl, or $R^1$ and $R^2$ combinedly form —$(CH_2)_4$—, and to novel and therapeutically valuable 5-pyridylthieno[2,3-e][1,4]diazepin-2-one derivates of the general formula:

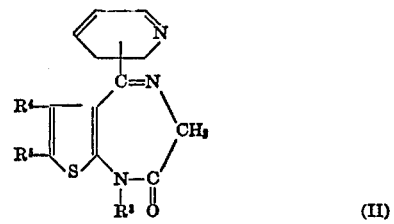

and the pharmaceutically acceptable acid addition salts thereof, wherein each of $R^3$, $R^4$ and $R^5$ is H or a lower alkyl group of from 1 to 4 carbon atoms (e.g., methyl, ethyl, propyl, isopropyl, butyl, isobutyl or tertiary butyl) which can be prepared from the 2-amino-3-pyridylcarbonylthiophene derivatives.

DETAILED DESCRIPTION OF THE INVENTION

The compounds of General Formula I can be produced by one of the methods (i) and (ii):
(i) In the case of compounds of General Formula I wherein $R^3$ is H, by reacting a compound of the formula

with a compound of the formula

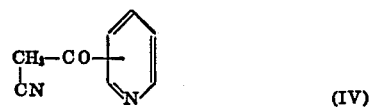

with sulfur.

The reaction in method (i) is usually carried out in a solvent such as methanol, ethanol, 2-propanol, benzene, toluene, xylene, dimethylformamide, dioxane, tetrahydrofuran, or a mixture thereof, preferably in the presence of an organic amine such as cyclohexylamine, diethylamine, morpholine, piperidine or triethylamine, at a temperature of from room temperature to reflux temperature, for about 1 to 24 hours.

(ii) In the case of compounds of General Formula I wherein $R^3$ is $C_{1-4}$ alkyl, by subjecting a compound of the formula

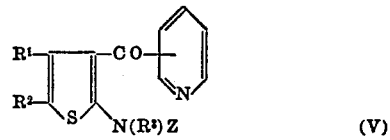

to hydrolysis, wherein Z is a reactive acid residue such as lower alkanol (e.g., acetyl, propionyl), arylsulfonyl (e.g., phenylsulfonyl, p - tolylsulfonyl) or alkylsulfonyl (e.g., methylsulfonyl).

The reaction in method (ii) is usually carried out in a solvent such as water, methanol, ethanol, 2-propanol, butanol, acetone, benzene, dioxane, tetrahydrofuran, dimethylformamide, or a mixture thereof, in the presence of an alkaline compound (e.g., sodium hydroxide, potassium hydroxide, barium hydroxide, sodium carbonate, potassium carbonate) or an acid (e.g., hydrochloric, hydrobromic, sulfuric acid), at a temperature of from room temperature to reflux temperature, for about 1 to 24 hours.

The starting compounds of Formula V can be prepared by reacting a compound obtainable by method (i) with a functional derivative (e.g., acid chloride, acid anhydride)

of an acid of the formula Z—OH, and then reacting the resulting compound of the formula

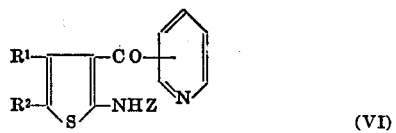

(VI)

as an alkali metal salt, with a compound of the formula $$R^3\text{—Hal} \quad (VII)$$

wherein Hal is a halogen atom (e.g., Cl, Br).

The reaction for preparing the starting compounds of Formula V is usually carried out in a solvent mentioned previously at a temperature of from room temperature to reflux temperature for about 1 to 24 hours.

The compounds of Formula I can be converted into the corresponding acid addition salts in a conventional manner by treatment with various inorganic and organic acids, for example, hydrochloric, hydrobromic, nitric, sulfuric, citric, maleic, fumaric, succinic, oxalic and tartaric acid.

The compounds of the Formula II can be prepared by the following methods:

(iii) By subjecting a compound of the formula:

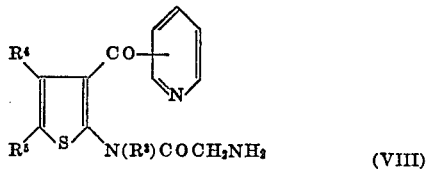

(VIII)

or a salt thereof, such as the hydrobromide or hydrochloride, to intramolecular condensation.

The reaction is usually carried out in a solvent, such as benzene, toluene, xylene, chloroform, tetrahydrofuran, dimethylformamide, pyridine or a mixture thereof, and if necessary, in the presence of a catalyst, such as acetic, phosphoric, sulfuric or perchloric acid, at an elevated temperature, and preferably at refluxing temperature. It is preferred that the water formed be continuously removed azeotropically.

(iv) By reacting a compound of the formula:

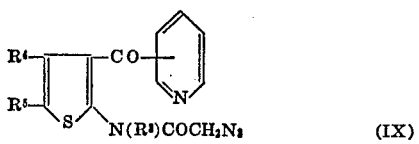

(IX)

with hydrazine.

The reaction is usually carried out in a solvent, such as methanol, ethanol, benzene, toluene, xylene, chloroform, methylenechloride, tetrahydrofuran, ether, dimethylformamide or a mixture thereof, at room temperature to an elevated temperature, and if desired, in the presence of a metal catalyst, such as palladium, platinum or nickel dispersed on a carrier, such as activated charcoal, diatomaceous earth, silica gel or glass, for the purpose of accelerating the reaction.

(v) By reacting a compound of the formula:

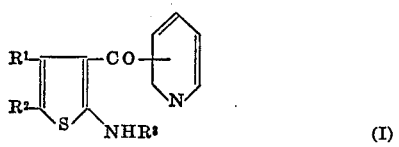

(I)

where $R^1$ and $R^2$ are hydrogen or a $C_{1-4}$ alkyl group with a compound of the formula:

$$H_2NCH_2COOR^6$$

or a salt, thereof such as the hydrochloride, wherein $R^6$ is lower alkyl.

The reaction is usually carried out in a solvent, such as benzene, toluene, chloroform, tetrahydrofuran, dimethylformamide, pyridine or a mixture thereof, at an elevated temperature, and preferably, at refluxing temperature. It is preferred that the water or lower alkanol formed be removed continuously.

The Compounds II where $R^3$ is lower alkyl of 1 to 4 carbon atoms are also produced by the following method:

(vi) By reacting a compound of the formula:

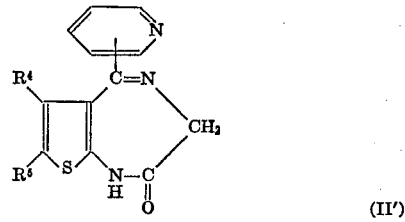

(II')

with a compound of the formula:

$$R^3\text{—X} \quad (X)$$

wherein X is a reactive atom or group (e.g., halogen, methylsulfonyloxy, p-tolylsulfonyloxy or sulfuric acid residue).

The reaction is usually carried out in a solvent by first converting the Compound II' into an alkali metal salt with a metalating agent, such as a metallic alkali (Li, Na or K) or an alkali metal compound (hydride, alkoxide or amide of an alkali metal), and then by reacting the alkali metal with the Compound X, at room temperature to refluxing temperature. The solvent is, for example, methanol, ethanol, benzene, xylene, tetrahydrofuran, dimethylformamide or a mixture thereof.

In all the aforementioned formulas illustrated above, $R^1$, $R^2$, $R^3$, $R^4$, and $R^5$ are defined as in Formulas I and II.

The compounds of Formula II can be converted into the corresponding acid addition salts in a conventional manner by treatment with various inorganic and organic acids, for example, hydrochloric, hydrobromic, nitric, sulfuric, maleic, fumaric, oxalic, tartaric, citric and succinic acid.

The compounds of Formula I and the pharmaceutically acceptable acid addition salts thereof have excellent pharmacological action such as analgesic and anti-inflammatory actions as shown, for example, by the following tests.

(1) ANALGESIC ACTION

According to the method of Hendershot et al. (J. Pharmacol. Exptl. Therap., 125, 237 (1957)), to one group of 6 dd-strain male mice each weighing about 20 g., a test solution containing a test Compound I was orally administered and one hour later 0.2 ml./20 g. of body weight of 0.02% o-phenyl-p-benzoquinone solution was intraperitoneally injected. The frequency of stretch symptoms thus induced was measured for 30 minutes, and compared with that of a control group, and the inhibition percentage (effect) was calculated. $ED_{50}$, the dose inducing 50% inhibition was obtained from the dose-effect correlation curve.

(2) ANTI-INFLAMMATORY ACTION

According to the method of Winter et al. (Proc. Soc. Exptl. Biol. Med., 111, 544 (1962)), to one group of 5 Donryustrain male rats each weighing about 130 g., a test solution containing a test Compound I was administered orally. One hour later 0.05 ml. of 1% carrageenin solution as a phlogogenic substance was subcutaneously injected to the paw of the hind leg. And 2 hours after the administration of phlogogen the bulk of the paw was measured in order to obtain the increment percentage over that before administration. The ratio of bulk increment between a control group and a test group was calculated as inhibition percentage, and $ED_{50}$, the dose inducing 50% inhibition, was obtained from the dose-effect correlation curve.

RESULTS

| Compound | ED$_{50}$, mg./kg. | |
|---|---|---|
| | Analgesic action | Anti inflammatory action |
| A | 50 | 50 |
| B | 50 | 50 |
| C | 25 | 80 |
| D | 25 | 50 |
| E | 50 | 70 |

Compounds A to B of the General Formula I are identified below:

A: 2-amino-3-nicotinoyl-5-ethylthiophene.
B: 2-amino-3-(2-pyridylcarbonyl)-5-ethylthiophene
C: 2-amino-3-nicotinoyl-5-methylthiophene.
D: 2-methylamino-3-(2-pyridylcarbonyl)-5-ethylthiophene.
E: 2-amino-3-(2-pyridylcarbonyl)-5-methylthiophene dimaleate.

In view of various tests, including those mentioned above, the compounds of the invention represented by Formula I and pharmaceutically acceptable acid addition salts thereof can be safely administered as analgesic-antiinflammatory agents for the treatment of various inflammatory symptoms (redness, swelling, heat, pain), trauma, pain due to the post-operation, and the like, in the form of a pharmaceutical preparation with a suitable and conventional carrier or adjuvant, administrable orally, without harm to the patients.

The pharmaceutical preparations using the compounds of the Formula I can take any conventional form such as tablets, capsules or powders.

FORMULATION EXAMPLE 50 mg. tablets are prepared from the following compositions:

| | Mg. |
|---|---|
| Compound I | 50 |
| Lactose | 97 |
| Starch | 20 |
| Microcrystalline cellulose | 30 |
| Methyl cellulose | 1 |
| Magnesium stearate | 2 |
| | 200 |

10% powders are prepared from the following compositions:

| | Percent |
|---|---|
| Compound I | 10 |
| Lactose | 79 |
| Starch | 10 |
| Methyl cellulose | 1 |
| | 100 |

The daily dose of Compound I or a salt thereof for human adults usually ranges from about 150 to 300 milligrams, in single or multiple dose, but it may be changed depending upon the age and/or symptoms of the patients.

The compounds of Formula II and their pharmaceutically acceptable acid addition salts have excellent pharmacological actions in suppressing fighting behavior and an anticonvulsant effect as shown, for example, by the following tests.

(I) SUPPRESSION OF FIGHTING BEHAVIOR

Fighting episodes were produced in mice by the method described by Tedeschi et al. in The Journal of Pharmacology and Experimental Therapeutics, vol. 125, p. 28 ff. (1959). Eight groups of female mice (4 pairs) were given the test Compound II orally, 60 minutes prior to receiving an electric foot-shock for 3 minutes with 530 volts interrupted direct current, 1.3 milliamperes, 10 cycles per second. Those exhibiting 3 fighting episodes or less within 3 minutes were deemed to be suppressed by the test compound. The control mice (81 pairs) had shown the fighting episodes of 8.7 times on the average under the same conditions. The ED$_{50}$, the dose required to suppress 50% of fighting pairs, was determined graphically.

(II) ANTICONVULSANT EFFECT

Pentylenetetrazole (150 mg./kg.) was administered subcutaneously to eight groups each containing 6 mice, 15 minutes after the intraperitoneal administration of the test Compound II. The number of dead mice were counted within 30 minutes after the administration of pentylenetetrazole, and then the ED$_{50}$, the dose required to suppress the lethal rate to 50%, was determined graphically.

RESULTS

| Compound: | Suppression of fighting behavior, ED$_{50}$ mg./kg. |
|---|---|
| F | 20 |
| G | 20 |
| H | 30 |
| J | 15 |

| Compound | Anticonvulsant effect, ED$_{50}$ mg./kg. |
|---|---|
| F | 1.25 |
| G | 7 |
| H | 3.5 |
| J | 7 |

The compounds F, G, H and J above are shown below:

F: 1-methyl-7-ethyl-5-(2-pyridyl)-1,2-dihydro-3H-thieno-[2,3-e][1,4]-diazepin-2-one.
G: 7-ethyl-5-(2-pyridyl)-1,2-dihydro-3H-thieno[2,3-e]-[1,4]-diazepin-2-one.
H: 1-methyl-7-ethyl-5-(3-pyridyl)-1,2-dihydro-3H-thieno[2,3-e][1,4]-diazepin-2-one dihydrochloride.
J: 7-ethyl-5-(3-pyridyl)-1,2-dihydro-3H-thieno[2,3-e]-[1,4]-diazepin-2-one.

In view of the various tests including those mentioned above, the compounds of this invention represented by Formula II can be administered safely as minor tranquilizers for the treatment of neurosis, anxiety, tension and depressive states, in the form of a pharmaceutical preparation with a suitable and conventional carrier or adjuvant, administered orally, without harm to the patients.

The pharmaceutical preparations using the compounds of the Formula II can take any conventional form, such as tablets, capsules or powders.

FORMULATION EXAMPLE 5 mg. and 10 mg. tablets are prepared from the following compositions.

| | Milligrams | |
|---|---|---|
| | 5 mg. tablet | 10 mg. tablet |
| Compound (II) | 5.0 | 10.0 |
| Lactose | 80.0 | 95.0 |
| Starch | 13.0 | 13.0 |
| Microcrystalline cellulose | 1.0 | 1.0 |
| Magnesium stearate | 1.0 | 1.0 |
| Total | 100.0 | 100.0 |

The oral daily dose of Compound II for human adults usually ranges from about 10 to 60 milligrams, in a single or multiple dose.

The present invention will be better understood from the following examples, which are merely intended to be illustrative and not limitative of the present invention.

EXAMPLE 1

A solution of 12 g. of butyraldehyde in 9 ml. of ethanol is added dropwise over a period of 30 minutes with stirring at 45–46° C. to a mixture of 25 g. of nicotinoylacetonitrile, 5.5 g. of sulfur, 26 ml. of dimethylformamide and 14 ml. of triethylamine. The resulting mixture is stirred at 45–46° C. for 1 hour, and then at room temperature for an additional 1 hour. To the reaction mixture is added 300 ml. of ice water. The crude crystalline product thus formed is collected by filtration, and recrystallized from ethanol to give 2-amino-3-nicotinoyl-5-ethylthiophene as pale yellow crystals, melting at 150–151° C., in 70% yield.

EXAMPLE 2

To a suspension of 11.2 g. of 2-(N-methylacetamido)-3-nicotinoyl-5-ethylthiophene in 20 ml. of ethanol is added a solution of 1.6 g. of sodium hydroxide in 20 ml. of water, and the resulting mixture is refluxed for 1 hour. Then the mixture is poured into ice water, the aqueous mixture is extracted with ethyl acetate, the extract is washed with water and dried over sodium sulfate, and the solvent is distilled off. The crude crystalline product thus obtained is recrystallized from hexane to give 2-methylamino-3-nicotinoyl-5-ethylthiophene as pale yellow crystals, melting at 70–71° C., in weight of 7.6 g.

The starting compound 2-(N-methylacetamido)-3-nicotinoyl-5-ethylthiophene is prepared in the following manner:

To 10 g. of 2-amino-3-nicotinoyl-5-ethylthiophene is added 25 ml. of acetic anhydride, and the solution is refluxed for 10 minutes. Then the reaction mixture is concentrated under reduced pressure, ethyl acetate is added to the residue, the solution is washed with water, and dried, and the solvent is distilled off. The oil obtained is treated with maleic acid in acetone, yielding a crude crystalline product, which is collected by filtration and recrystallized from a mixture of ethanol and ethyl acetate (1:2) to give 11.3 g. of 2 - acetamido-3-nicotinoyl-5-ethylthiophene maleate as pale yellow crystals. This product gradually becomes brown at 240° C. and decomposes at 266° C. The maleate thus obtained is converted into the free base by adding 200 ml. of water, neutralizing with sodium hydrogen carbonate, extracting with three 20 ml. portions of ethyl acetate, drying over sodium sulfate, and distilling off the solvent. The residue 2-acetamido-3-nicotinoyl-5-ethylthiophene in the form of free base is used for the next reaction.

To a solution of 4 g. of 2-acetamido-3-nicotinoyl-5-ethylthiophene in 30 ml. of dimethylformamide is added 0.9 g. of sodium hydride (in 50% mineral oil), and the resulting mixture is stirred at 50° C. for 20 minutes. After cooling 3.8 g. of methyl iodide is added, and the whole mixture is stirred at room temperature for 1.5 hours. Then 300 ml. of ice water is added, and the aqueous mixture is extracted with two 200 ml. portions of ethyl acetate. The organic extract layer is washed with water and reextracted with two 30 ml. portions of 5% hydrochloric acid. The acid extract is washed with ethyl acetate and made alkaline with sodium carbonate, the alkaline solution is extracted with two 200 ml. portions of ethyl acetate, washed with water, and dried over anhydrous magnesium sulfate, and the solvent is distilled off under reduced pressure. The oily product obtained is purified by column-chromatography using 70–325 mesh silica gel and chloroform (eluent). The chloroform eluate (12 ml.) is concentrated under reduced pressure. The oily residue is treated with oxalic acid in ethyl acetate, giving a crude crystalline product, which is collected by filtration and recrystallized from a mixture of ethyl acetate and acetone (1:1) to give 2 - (N - methylacetamido)-3-nicotinoyl-5-ethylthiophene oxalate as pale yellow crystals, melting at 155–157° C. The oxalate thus obtained is converted into the free base by adding 200 ml. of water, neutralizing with sodium hydrogen carbonate, extracting with three 200 ml. portions of ethyl acetate, drying over sodium sulfate, and distilling off the solvent. The residue 2-(N-methylacetamido)-3-nicotinoyl-5-ethylthiophene in the form of free base is used for the next reaction, namely as starting compound in Example 2.

EXAMPLE 3

Following an identical procedure as described in Example 2, but using as starting compound 2-(N-methyl-p-toluenesulfonamido) - 3 - (2 - pyridylcarbonyl)-5-ethylthiophene (its oxalate: M.P. 104–105° C., pale pink crystals), which is prepared by reacting 2-amino-3-(2-pyridylcarbonyl)-5-ethylthiophene with p-toluenesulfonyl chloride in pyridine and then reacting the resulting 2-(p-toluenesulfonamido)-3-(2-pyridylcarbonyl)-5-ethylthiophene (M.P. 107–109° C., orange crystals) with methyl iodide, instead of 2 - (N-methylacetamido)-3-nicotinoyl-5-ethylthiophene, there is obtained 2-methylamino-3-(2-pyridylcarbonyl)-5-ethylthiophene as pale yellow crystals, melting at 84–85° C.

Using the procedure set forth in the above example, but substituting equivalent amounts of the appropriate starting materials, the following compounds are also produced:

(1) 2-amino-3-(2-pyridylcarbonyl)-4,5-dimethylthiophene, pale yellow crystals, melting at 122–123° C.;
(2) 2-amino-3-(2-pyridylcarbonyl)-4,5,6,7-tetrahydro-1-benzothiophene, pale yellow crystals, melting at 242° C. with decomposition;
(3) 2-amino-3-isonicotinoyl-5-ethylthiophene, pale yellow crystals, melting at 216–217° C.;
(4) 2-amino-3-(2-pyridylcarbonyl)-5-ethylthiophene, hydrochloride (pale brown crystals) melting at 219–220° C. with decomposition; dimaleate (pale brown crystals) melting at 113–114° C.;
(5) 2-amino-3-nicotinoyl-4,5-dimethylthiophene, pale yellow crystals, melting at 185–186° C. with decomposition;
(6) 2-amino-3-nicotinoyl-5-methylthiophene, pale, yellow crystals, melting at 144–145° C.; and
(7) 2-amino-3-(2-pyridylcarbonyl)-5-methylthiophene, dimaleate (brown crystals) melting at 116–117° C.

EXAMPLE 4

To a solution of 5 g. of 2-amino-3-(2-pyridylcarbonyl)-5-ethylthiophene prepared as described in Example 1 in 50 ml. of pyridine are added 11 g. of ethyl glycinate hydrochloride and 15 ml. of benzene, and the whole mixture is stirred under reflux for 20 hours in a flask fitted with a water-removing adapter. To the reaction mixture are added ice water and then chloroform, the solution is washed with a saturated sodium hydrogen carbonate solution and dried, and the solvent is then distilled off. The oil obtained is purified by column chromatography using 70–325 mesh silica gel and a mixture of chloroform and methanol (50:3) as the eluent. The eluate is concentrated to give the crude crystalline product, which is recrystallized from ethanol to give 7-ethyl-5-(2-pyridyl)-1,2-dihydro-3H-thieno[2,3-e][1,4]diazepin-2-one as pale yellow crystals, melting at 228 to 234° C. with decomposition, in 48% yield.

EXAMPLE 5

A mixture of 5 g. of 2-methylamino-3-(2-pyridylcarbonyl)-5-ethylthiophene prepared as described in Example 2, 12 g. of ethyl glycinate hydrochloride and 130 ml. of pyridine is stirred under heating for about 4 hours to remove 50 ml. of a distillate, and then the remaining mixture is refluxed for a further 12 hours. The reaction mixture is then treated by the procedure described in Example 4 to give 1-methyl-7-ethyl-5-(2-pyridyl)-1,2-dihydro-3H-thieno[2,3-e][1,4]diazepin-2-one as white needles, melting at 120–121° C., in 31% yield.

EXAMPLE 6

A mixture of 9.0 g. of 2-aminoacetamido-3-(2-pyridylcarbonyl)-5-ethylthiophene, 63 ml. of pyridine, 18 ml. of benzene and 2.0 g. of acetic acid is refluxed for 9 hours. The solvent is then distilled off under reduced pressure, water is added to the residue, the aqueous solution is made alkaline with sodium hydrogen carbonate and extracted with chloroform. The chloroform is then distilled off and the crude crystalline product obtained is recrystallized from ethanol to give 7-ethyl-5-(2-pyridyl)-1,2-dihydro-3H-thieno[2,3-e][1,4]diazepin-2-one as pale yellow crystals, in 89% yield. This product begins to turn brown at 228° C. and decomposes completely at 234° C.

EXAMPLE 7

To a suspension of 3 g. of 2-azidoacetamido - 3 - (2-pyridylcarbonyl)-5-ethylthiophene in 50 ml. of ethanol, 1.9 g. of 5% palladium charcoal is added. Then, a solution of 0.26 g. of hydrazine hydrate in 5 ml. of ethanol is added with stirring, and the whole mixture is stirred at room temperature for 2 hours (generation of nitrogen gas occurs vigorously) and then at 50° C. for 30 minutes. The reaction mixture is filtered, and the filtrate is concentrated under reduced pressure. The oily product is purified by column chromatography using 70–325 mesh silica gel and a mixture of chloroform and methanol (50:3) as an eluant. The eluate is concentrated under reduced pressure, and the crude crystalline product obtained is recrystallized from ethanol to give 7-ethyl-5-(2-pyridyl)-1,2-dihydro-3H-thieno[2,3-e][1,4]diazepin-2-one as pale yellow crystals, melting at 228–234° C. with decomposition, in 54% yield.

starting compounds, the following compounds are also produced:

(1) 7-ethyl-5-(3-pyridyl)-1,2-dihydro-3H-thieno[2,3 - e]-[1,4]diazepin-2-one, melting at 230–231° C. with decomposition.
(2) 1-methyl-7-ethyl-5-(3 - pyridyl) - 1,2 - dihydro-3H-thieno[2,3-e][1,4]diazepin - 2 - one dihydrochloride, melting at 172–173° C. with decomposition.
(3) 7-ethyl-5-(4-pyridyl)-1,2-dihydro-3H-thieno[2,3 - e]-[1,4]diazepin-2-one, melting at 218–219° C.
(4) 1-methyl-7-ethyl-5-(4-pyridyl) - 1,2 - dihydro-3H-thieno[2,3-e][1,4]diazepin - 2 - one, melting at 164–165° C.
(5) 6,7-dimethyl-5-(3-pyridyl)-1,2-dihydro - 3H - thieno-[2,3-e][1,4]diazepin-2-one, melting at 236–237° C. with decomposition.
(6) 7-methyl-5-(3-pyridyl) - 1,2 - dihydro - 3H - thieno-[2,3-e][1,4]diazepin-2-one, melting at 248–249° C. with decomposition.
(7) 1,7-dimethyl-5-(3-pyridyl)-1,2-dihydro - 3H - thieno-[2,3-e][1,4]diazepin-2-one dihydrochloride, melting at 236–237° C. with decomposition.

The starting Compounds VIII and IX are also new compounds and can be produced, for example, by the following methods:

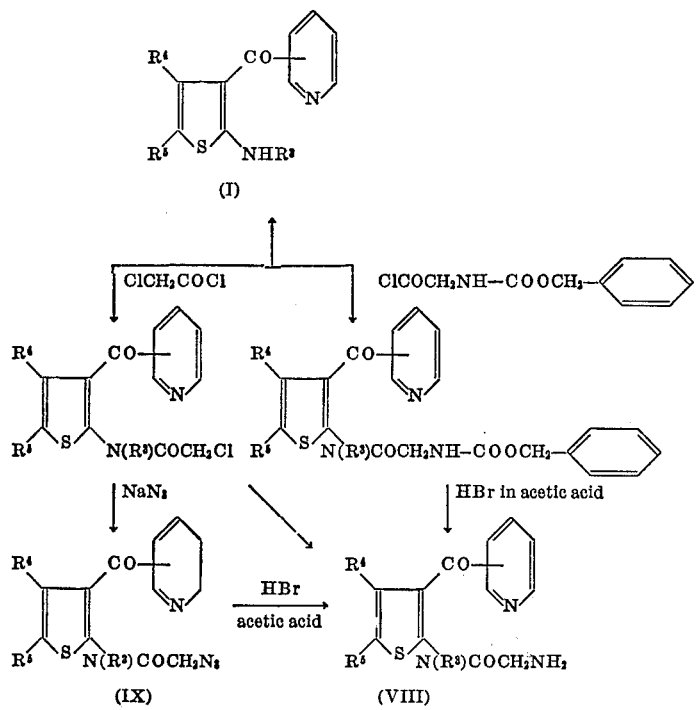

EXAMPLE 8

To a suspension of 2.2 g. of 7-ethyl-5-(2-pyridyl)-1,2-dihydro-3H-thieno[2,3-e][1,4]diazepin-2-one in 40 ml. of dimethylformamide is added 0.5 g. of sodium hydride (50% in mineral oil), the whole mixture is stirred at 70° C. for 30 minutes, and then cooled to room temperature. 1.5 g. of methyl iodide is added, and the resulting mixture is stirred for 30 minutes. Water is then added to the reaction mixture, the whole is extracted with toluene, the toluene extract is washed with water and dried, and the solvent is then distilled off under reduced pressure. The crude crystalline product obtained is recrystallized from hexane to give 1 - methyl-7-ethyl-5-(2-pyridyl)-1,2-dihydro - 3H - thieno[2,3-e][1,4]diazepin - 2 - one as white needles, melting at 120–121° C., 78% yield.

Using the procedures set forth in the above examples, but substituting equivalent amounts of the appropriate Specific examples of the preparation of starting Compounds VIII and IX are as follows:

(1) PREPARATION OF STARTING COMPOUNDS VIII (a) To a suspension of 13 g. of 2-amino-3-(2-pyridylcarbonyl)-5-ethylthiophene hydrochloride prepared as described in Example 1 and converted to the hydrochloride salt in 60 ml. of chloroform is added, under ice cooling, 13 g. of N-benzyloxycarbonylglycyl chloride, and the resulting mixture is stirred for 10 minutes and then allowed to stand at room temperature for 24 hours. To the reaction mixture is added ice water saturated with sodium hydrogen carbonate. The mixture is extracted with chloroform, the chloroform extract is dried over sodium sulfate, and the solvent is distilled off under reduced pressure. The oil obtained is purified by column chromatography using a 70–325 mesh silica gel and a mixture of chloroform and methanol (50:3) as an eluent. The eluate is concentrated under reduced pressure to give the crude crystalline product, which is recrystallized from a mixture of chloroform and ethanol to give 2-benzyloxycarbonylaminoacetamido-3-(2 - pyridylcarbonyl)-5-ethylthiophene as pale yellow crystals, melting at 135–136° C., in 85% yield.

To 10 g. of 2-benzyloxycarbonylaminoacetamido-3-(2-pyridylcarbonyl)-5-ethylthiophene is added 30 ml. of a 30% solution of hydrogen bromide in acetic acid. The resulting mixture is stirred at room temperature (the reaction proceeds with the generation of carbon dioxide gas), and after 1 hour, 500 ml. of isopropyl ether is added. The crystals thus obtained are suspended in 50 ml. of water, the suspension is made alkaline with sodium hydrogen carbonate and extracted with chloroform. The chloroform extract is dried, and the solvent is then distilled off under reduced pressure. The crude product thus obtained is recrystallized from ethanol to give 2-aminoacetamido-3-(2-pyridylcarbonyl)-5-ethylthiophene as pale yellow crystals, melting at 222–224° C., in 82% yield.

(b) To a suspension of 5 g. of 2-chloroacetamido-3-(2-pyridylcarbonyl)-5-ethylthiophene obtained by reacting chloroacetyl chloride with 2-amino-3-(2-pyridylcarbonyl)-5-ethylthiophene in a conventional manner in 20 ml. of chloroform are added a catalytic amount of sodium iodide and 2 ml. of ethanol. Ammonia gas is introduced under ice cooling for 3 hours, and then the solution is stirred at room temperature for 10 hours. Ice water is added to the reaction mixture, the resulting solution is washed with a saturated sodium hydrogen carbonate solution and dried, and the solvent is then distilled off under reduced pressure. The crude product thus obtained is recrystallized from ethanol to give 3.7 g. of 2-aminoacetamido-3-(2-pyridylcarbonyl)-5-ethylthiophene as pale yellow crystals, melting at 222–224° C.

(c) To 3 g. of 2-azidoacetamido-3-(2-pyridylcarbonyl)-5-ethylthiophene prepared by reacting sodium azide with 2-chloroacetamido-3-(2-pyridylcarbonyl) - 5 - ethylthiophene in (b) above is added 30 ml. of a 30% solution of hydrogen bromide in acetic acid. Vigorous generation of nitrogen gas occurs and ends after 10 minutes. The mixture is then shaken for 50 minutes. To the reaction mixture is added 200 ml. of isopropyl ether. The mixture is stirred well, the supernatant liquid is decanted, the residue is saturated with sodium hydrogen carbonate, and the mixture is extracted with chloroform. The chloroform extract is washed with water and dried over sodium sulfate, and the solvent is distilled off under reduced pressure. The crude product thus obtained is recrystallized from ethanol to give 2.1 g. of 2-aminoacetamido-3-(2-pyridylcarbonyl)-5-ethylthiophene as pale yellow crystals melting at 222–224° C. with decomposition.

(2) PREPARATION OF STARTING COMPOUND IX

To a stirred solution of 3.1 g. of 2-chloroacetamido-3-(2-pyridylcarbonyl)-5-ethylthiophene (M.P. 105–106° C.) in 20 ml. of dimethylformamide is added 0.8 g. of sodium azide, and the resulting mixture is heated at 60° C. for 30 minutes. To the reaction mixture is added 100 ml. of ice water, the aqueous layer is decanted, and the residue is crystallized from ethanol. The crude product thus obtained is recrystallized from a mixture of chloroform and ethanol to give 2.9 g. of 2-azidoacetamido-3-(2-pyridylcarbonyl)-5-ethylthiophene as pale yellow crystals, melting at 213–214° C. with decomposition.

Similarly, the following starting Compounds VIII and IX are produced:

(1) 2-aminoacetamido-3-nicotinoyl-5-ethylthiophene melting at 113–115° C.
(2) 2-aminoacetamido-3-isonicotinoyl-5-ethylthiophene, melting at 118–119° C. and its dihydrobromide melting at 205–206° C. with decomposition.
(3) 2-azidoacetamido-3-nicotinoyl-5-ethylthiophene, melting at 206–207° C. with decomposition.
(4) 2-azidoacetamido-3-isonicotinoyl-5-ethylthiophene, melting at 250–251° C. with decomposition.
(5) 2-aminoacetamido-3-nicotinoyl-4,5-dimethylthiophene, melting at 196–197° C. with decomposition.
(6) 2 - aminoacetamido-3-nicotinoyl-5-methylthiophene, melting at 112–113° C. and its dihydrochloride, melting at 251–252° C. with decomposition.

Although the present invention has been adequately set forth and described in the foregoing specification and examples included therein, it is readily apparent that various changes and modifications can be made without departing from the spirit and scope thereof.

What is claimed is:

1. 2-amino-3-pyridylcarbonylthiophene compounds of the formula:

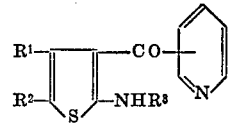

wherein each of $R^1$, $R^2$ and $R^3$ is H or $C_{1-4}$ alkyl or $R^1$ and $R^2$ combinedly form $-(CH_2)_4-$; and pharmaceutically acceptable acid addition salts thereof.

2. The compound of claim 1: 2-amino-3-nictotinoyl-5-ethylthiophene.

3. The compound of claim 1: 2-amino-3-(2-pyridylcarbonyl)-4,5-dimethylthiophene.

4. The compound of claim 1: 2-amino-3-(2-pyridylcarbonyl)-4,5,6,7-tetrahydro-1-benzothiophene.

5. The compound of claim 1: 2-methylamino-3-nicotinoyl-5-ethylthiophene.

6. The compound of claim 1: 2-methylamino-3-(2-pyridylcarbonyl)-5-ethylthiophene.

7. The compound of claim 1: 2-amino-3-isonicotinoyl-5-ethylthiophene.

8. The compound of claim 1: 2-amino-3-(2-pyridylcarbonyl)-5-ethylthiophene.

9. The compound of claim 1: 2-amino-3-nicotinoyl-4,5-dimethylthiophene.

10. The compound of claim 1: 2-amino-3-nicotinoyl-5-methylthiophene.

11. The compound of claim 1: 2-amino-3-(2-pyridylcarbonyl)-5-methylthiophene.

12. The compound:

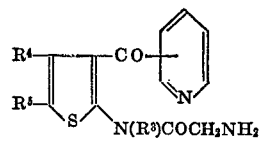

wherein each of $R^3$, $R^4$ and $R^5$ is a member selected from the group consisting of H and a lower alkyl group of from 1 to 4 carbon atoms.

13. The compound:

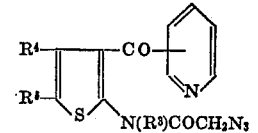

wherein each of $R^3$, $R^4$ and $R^5$ is a member selected from the group consisting of H and a lower alkyl group of from 1 to 4 carbon atoms.

References Cited

UNITED STATES PATENTS 3,408,358   10/1968   Hardtmann et al. __ 260—294.8 D

ALAN L. ROTMAN, Primary Examiner

U.S. Cl. X.R.

260—239.3 B, 294.9; 424—263, 266